(12) United States Patent
Lah

(10) Patent No.: US 9,482,348 B2
(45) Date of Patent: Nov. 1, 2016

(54) CYCLE VALVE FOR USE IN HYDROMETHANATION PROCESS

(71) Applicant: Ruben F. Lah, South Jordan, UT (US)

(72) Inventor: Ruben F. Lah, South Jordan, UT (US)

(73) Assignee: DeltaValve, LLC, Sandy, UT (US)

( * ) Notice: Subject to any disclaimer, the term of this patent is extended or adjusted under 35 U.S.C. 154(b) by 177 days.

(21) Appl. No.: 14/534,515

(22) Filed: Nov. 6, 2014

(65) Prior Publication Data

US 2016/0131265 A1  May 12, 2016

(51) Int. Cl.
| | | |
|---|---|---|
| *F16K 3/02* | (2006.01) | |
| *F16K 3/26* | (2006.01) | |
| *F16K 31/122* | (2006.01) | |
| *F16K 37/00* | (2006.01) | |

(52) U.S. Cl.
CPC ............. *F16K 3/029* (2013.01); *F16K 3/0227* (2013.01); *F16K 31/122* (2013.01); *F16K 37/0008* (2013.01)

(58) Field of Classification Search
CPC .... F16K 37/008; F16K 3/029; F16K 3/0227; F16K 31/122; F16K 3/24; F16K 3/262; F16K 3/265; F16K 3/26
USPC .......................................... 251/196, 326–329
See application file for complete search history.

(56) References Cited

U.S. PATENT DOCUMENTS

| | | |
|---|---|---|
| 25,137 A | 8/1859 | Parker |
| 325,900 A | 9/1885 | Bartlett |
| 469,695 A | 3/1892 | Griffin |
| 481,520 A | 8/1892 | Bartholomew |
| 733,985 A | 7/1903 | Lundquist |
| 1,001,970 A * | 8/1911 | McCarthy ................. F16K 3/24 251/191 |
| 1,780,160 A * | 11/1930 | Leach ........................ F16K 3/26 137/246.14 |
| 1,871,965 A * | 8/1932 | Du Bois .................. F16K 3/262 251/175 |
| 1,990,762 A * | 2/1935 | Vetrano .................... F16K 3/186 251/176 |
| 2,039,465 A * | 5/1936 | Vetrano ..................... F16K 5/08 251/196 |
| 2,192,331 A * | 3/1940 | Schaefer ................. F16K 3/262 251/176 |
| 2,196,202 A * | 4/1940 | Corbin, Jr. ................ F16K 3/26 137/270 |

(Continued)

FOREIGN PATENT DOCUMENTS

| | | | | |
|---|---|---|---|---|
| DE | 486624 C | * | 11/1929 | ............. F16K 3/262 |
| FR | 1478125 A | * | 4/1967 | ............... F16K 3/22 |

(Continued)

OTHER PUBLICATIONS

Aerodyne StopTight Slide Gate http://www.dustcollectorhq.com/news/unique-stoptight-slide-gate-valve.html.

*Primary Examiner* — Marina Tietjen
(74) *Attorney, Agent, or Firm* — Michael F. Krieger; Kirton McConkie

(57) ABSTRACT

A cycle valve can include a valve body and a dynamic sealing spool assembly contained within the interior of the valve body. The dynamic sealing spool assembly includes a sleeve and a gate cartridge assembly which slides within the sleeve between an open and a closed position. The sleeve can include a sleeve opening while the gate cartridge assembly can include two openings, each of which includes a dynamic seat assembly. The dynamic seat assembly in one opening can be formed by upper and lower dynamic seats configured as solid blocks which seal the pathway through the valve when the gate cartridge assembly is in the closed position. The dynamic seat assembly in the other opening can be formed by upper and lower dynamic seats configured as cylinders which form the pathway through the valve when the gate cartridge assembly is in the open position.

20 Claims, 9 Drawing Sheets

(56) References Cited

U.S. PATENT DOCUMENTS

| | | | |
|---|---|---|---|
| 2,385,463 A * | 9/1945 | Penick | F16K 3/26 251/196 |
| 2,485,316 A | 10/1949 | Robbins, Jr. et al. | |
| 2,636,712 A | 4/1953 | Lubbock | |
| 3,726,306 A | 4/1973 | Purvis | |
| 4,253,487 A | 3/1981 | Worley et al. | |
| 4,261,385 A | 4/1981 | Worley | |
| 4,378,817 A | 4/1983 | Houston | |
| 5,706,851 A | 1/1998 | Lopez-Gomez et al. | |
| 7,204,474 B2 | 4/2007 | McGuire et al. | |
| 8,181,935 B2 | 5/2012 | Haberhauffe et al. | |
| 2003/0047702 A1 | 3/2003 | Gunnarsson et al. | |
| 2004/0045603 A1 | 3/2004 | McCarty et al. | |

FOREIGN PATENT DOCUMENTS

| | | | | |
|---|---|---|---|---|
| GB | 190905269 A | * | 0/1909 | F16K 3/262 |
| JP | H08-128563 A | | 5/1996 | |
| WO | WO8203258 | | 9/1982 | |

\* cited by examiner

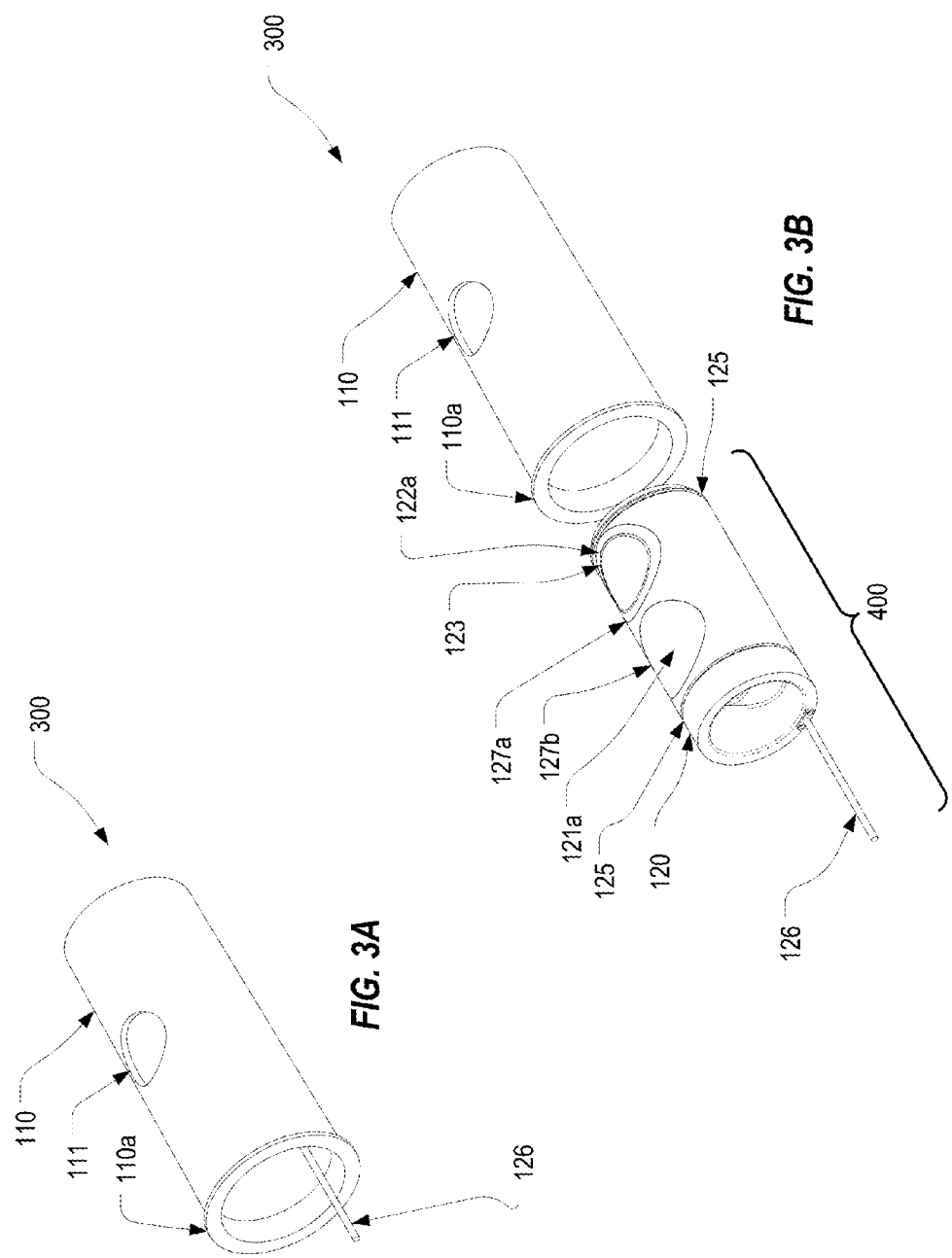

CYCLE VALVE FOR USE IN HYDROMETHANATION PROCESS

CROSS-REFERENCE TO RELATED APPLICATIONS

Not Applicable.

BACKGROUND

Hydromethanation is a process for producing methane from carbon-rich feedstocks such as coal, petroleum coke, or biomass. In this process, carbon is converted through a combination of catalytic reactions in the presence of water into methane. FIG. 1 provides a schematic of an example system in which the hydromethanation process can be carried out.

As shown in FIG. 1, the hydromethanation process is typically carried out in a fluidized bed reactor 13. A mixing stage 11 is employed to mix the carbon-rich feedstocks with a catalyst. Typically, the feedstocks are ground into fine particles to which the catalyst adheres. This mixture is then loaded into fluidized bed reactor 13 where pressurized steam fluidizes the mixture to maintain constant contact between the carbon and the catalyst. This constant contact promotes a series of reactions that convert the carbon and water into methane and carbon dioxide.

Solid byproducts of the process, including the catalyst, can be recovered through a catalyst recovery stage 12 which feeds the recovered catalyst back to mixing stage 11 for reuse. The methane and carbon dioxide escape upwardly where they are piped through a cyclone stage 14 for removing particulates, a cooling stage 15, and a gas separation stage 16. Gas separation stage 16 is employed to remove the carbon dioxide and any other gas byproducts (e.g., ammonia, sulfur, or other impurities found in the feedstocks) from the methane.

BRIEF SUMMARY

The present invention extends to a cycle valve that can be used in a system for implementing the hydromethanation process as well as in other systems. A cycle valve in accordance with embodiments of the present invention can be employed at various locations within a hydromethanation system. A cycle valve can include a valve body and a dynamic sealing spool assembly contained within the interior of the valve body. The dynamic sealing spool assembly includes a sleeve and a gate cartridge assembly which slides within the sleeve between an open and a closed position. The sleeve can include a sleeve opening while the gate cartridge assembly can include two openings, each of which includes a dynamic seat assembly. The dynamic seat assembly in one opening can be formed by upper and lower dynamic seats configured as solid blocks which seal the pathway through the valve when the gate cartridge assembly is in the closed position. The dynamic seat assembly in the other opening can be formed by upper and lower dynamic seats configured as cylinders which form the pathway through the valve when the gate cartridge assembly is in the open position.

In one embodiment, a valve can comprise a valve body having a first flange, a first cover configured to attach to the first flange, a first port, and a second port. The first and second ports can form ports of a pathway through the valve body. The valve can also comprise a sleeve that inserts through the first flange into an interior of the valve body. The sleeve can have a sleeve opening that aligns with the first and second ports. The valve can further comprise a piston gate configured to insert into the sleeve. The piston gate can have a first opening configured to align with the sleeve opening when the piston gate is in an open position and a second opening configured to align with the sleeve opening when the piston gate is in a closed position. The valve can also have a first dynamic seat assembly contained within the first opening of the piston gate and a second dynamic seat assembly contained within the second opening of the piston gate. The first dynamic seat assembly can comprise a first upper dynamic seat, a first lower dynamic seat, and a plurality of springs positioned between the first upper dynamic seat and the first lower dynamic seat to bias the first upper dynamic seat and first lower dynamic seat against an inner surface of the sleeve surrounding the sleeve opening when the piston gate is in the open position. The first upper dynamic seat and the first lower dynamic seat each can have a cylindrical shape that forms the pathway between the first and second ports when the piston gate is in the open position. The second dynamic seat assembly can comprise a second upper dynamic seat, a second lower dynamic seat, and a second plurality of springs positioned between the second upper dynamic seat and the second lower dynamic seat to bias the second upper dynamic seat and second lower dynamic seat against the inner surface of the sleeve surrounding the sleeve opening when the piston gate is in the closed position. The second upper dynamic seat and the second lower dynamic seat can comprise solid blocks that cover the sleeve opening to block the pathway between the first and second ports when the piston gate is in the closed position.

In another embodiment, a valve can comprise a valve body having a first flange, a first cover configured to attach to the first flange, a first port, and a second port. The first and second ports can form ports of a pathway through the valve body. The valve can also comprise a sleeve that inserts through the first flange into an interior of the valve body. The sleeve can have a sleeve opening that aligns with the first and second ports. The valve can further comprise a piston gate configured to insert into the sleeve. The piston gate can have a first opening configured to align with the sleeve opening when the piston gate is in an open position and a second opening configured to align with the sleeve opening when the piston gate is in a closed position. The valve can also have a first dynamic seat assembly contained within the first opening of the piston gate and a second dynamic seat assembly contained within the second opening of the piston gate. The first dynamic seat assembly can comprise a first upper dynamic seat and a first lower dynamic seat. The first upper dynamic seat and first lower dynamic seat can be biased against an inner surface of the sleeve surrounding the sleeve opening. The first upper dynamic seat and the first lower dynamic seat can form a seal to block the pathway between the first and second ports when the piston gate is in the closed position. The second dynamic seat assembly can comprise a second upper dynamic seat and a second lower dynamic seat. The second upper dynamic seat and second lower dynamic seat can be biased against the inner surface of the sleeve surrounding the sleeve opening. The second upper dynamic seat and the second lower dynamic seat can form the pathway between the first and second ports when the piston gate is in the open position.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates a dynamic sealing spool assembly of the cycle valve of FIG. 2A with the gate cartridge assembly contained within the sleeve;

FIG. 3B illustrates the dynamic sealing spool assembly of FIG. 3A with the gate cartridge assembly removed from the sleeve;

DETAILED DESCRIPTION

Figure 2A:
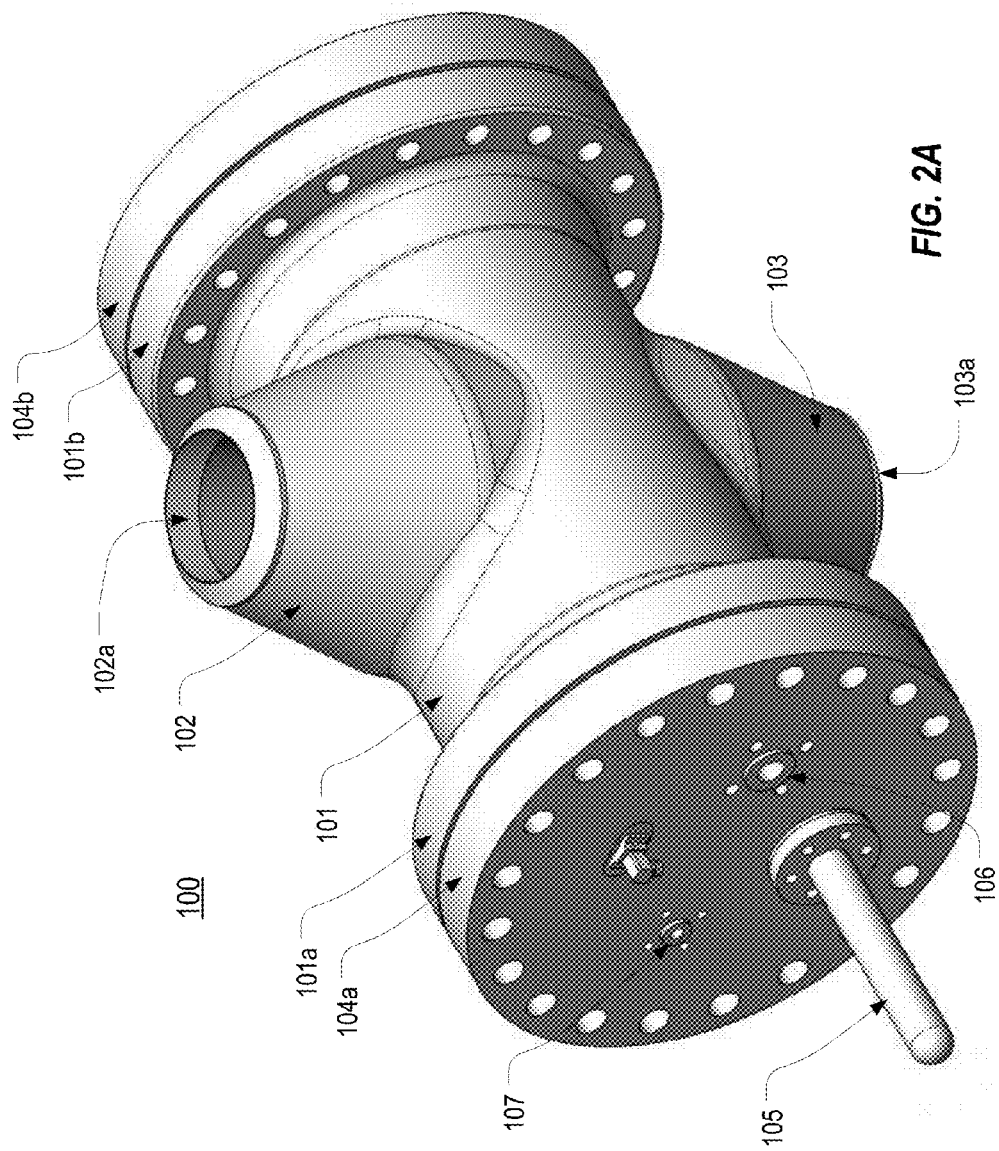
FIG. 2A illustrates a perspective view of an assembled cycle valve in accordance with one or more embodiments of the present invention.
Figure 2B:
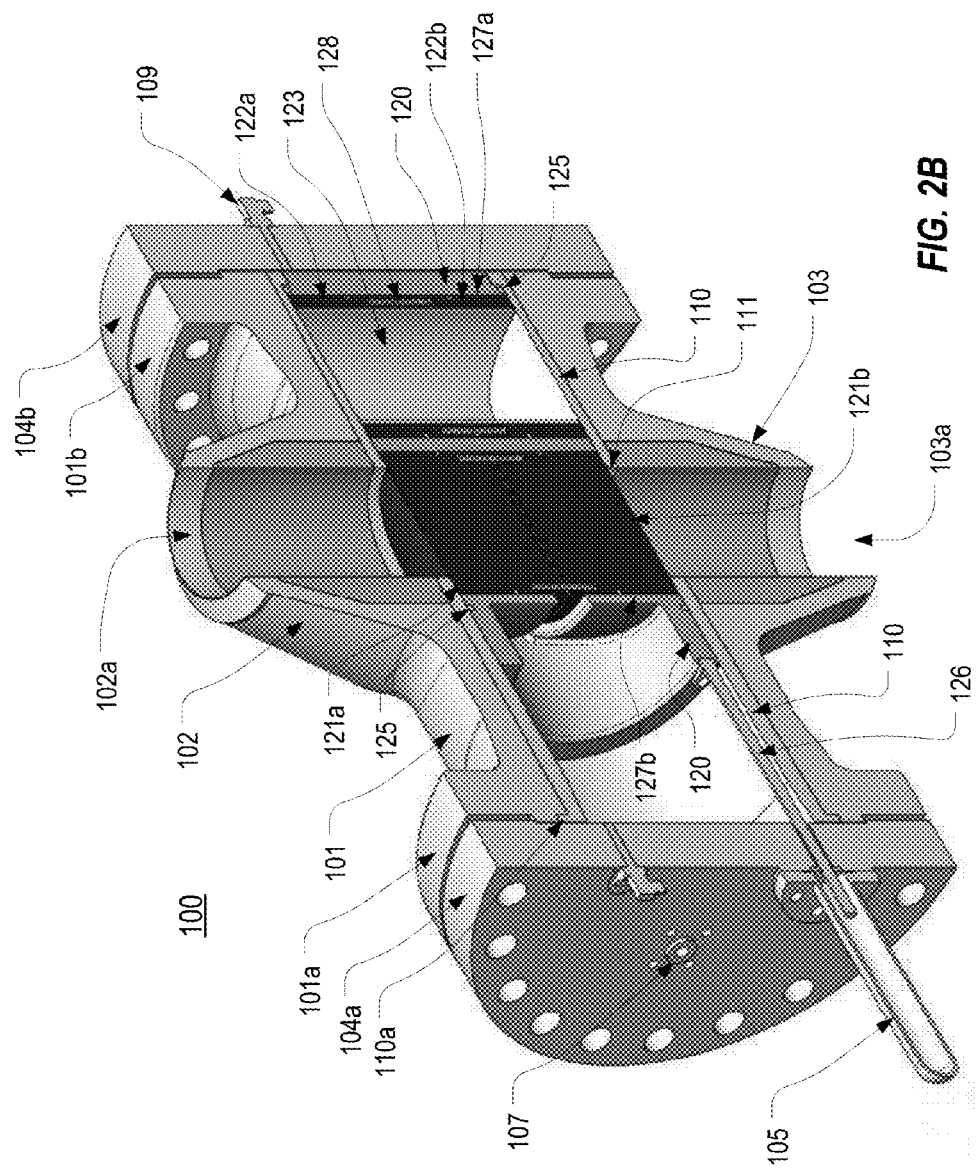
FIG. 2B illustrates a cross-sectional perspective view of the cycle valve of FIG. 2A showing the valve in a closed position.
Figure 2C:
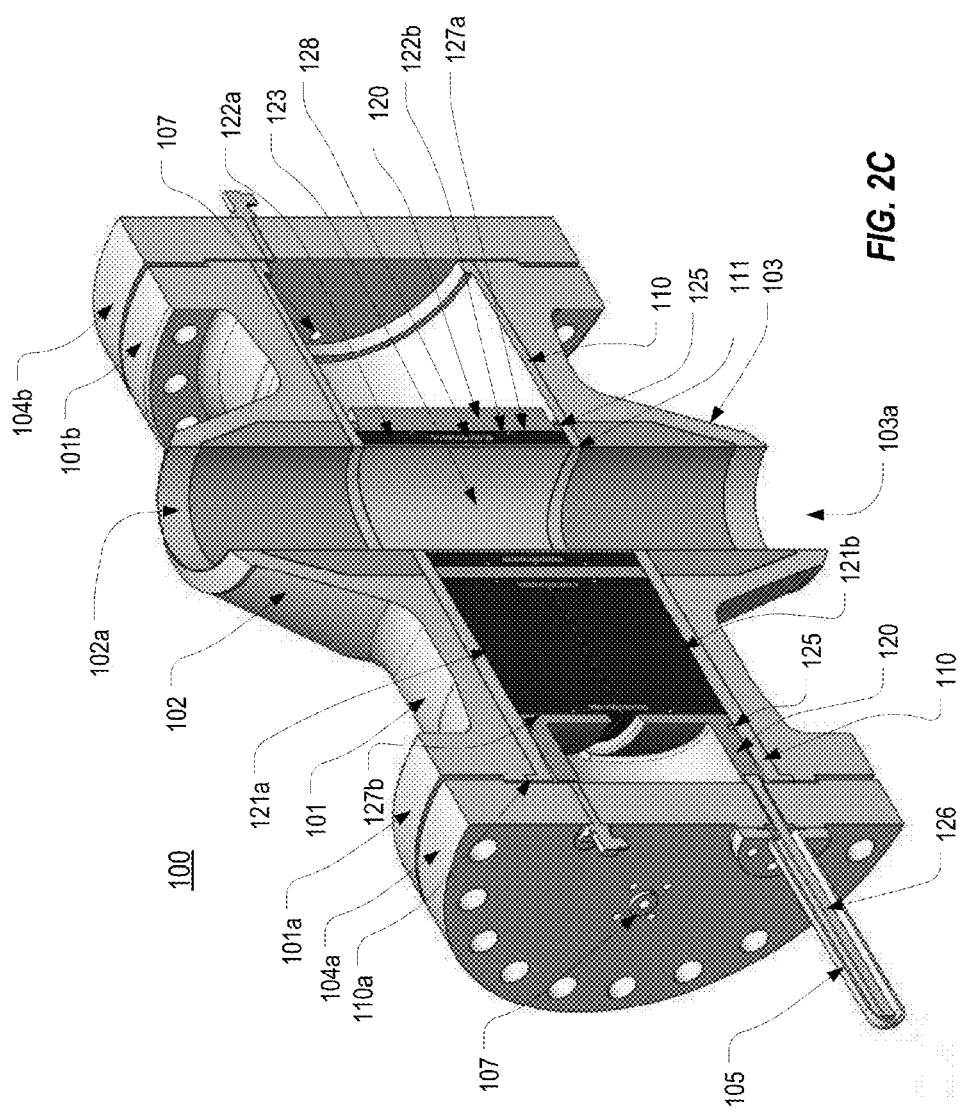
FIG. 2C illustrates a cross-sectional perspective view of the cycle valve of FIG. 2A showing the valve in an open position.
Figure 2D:
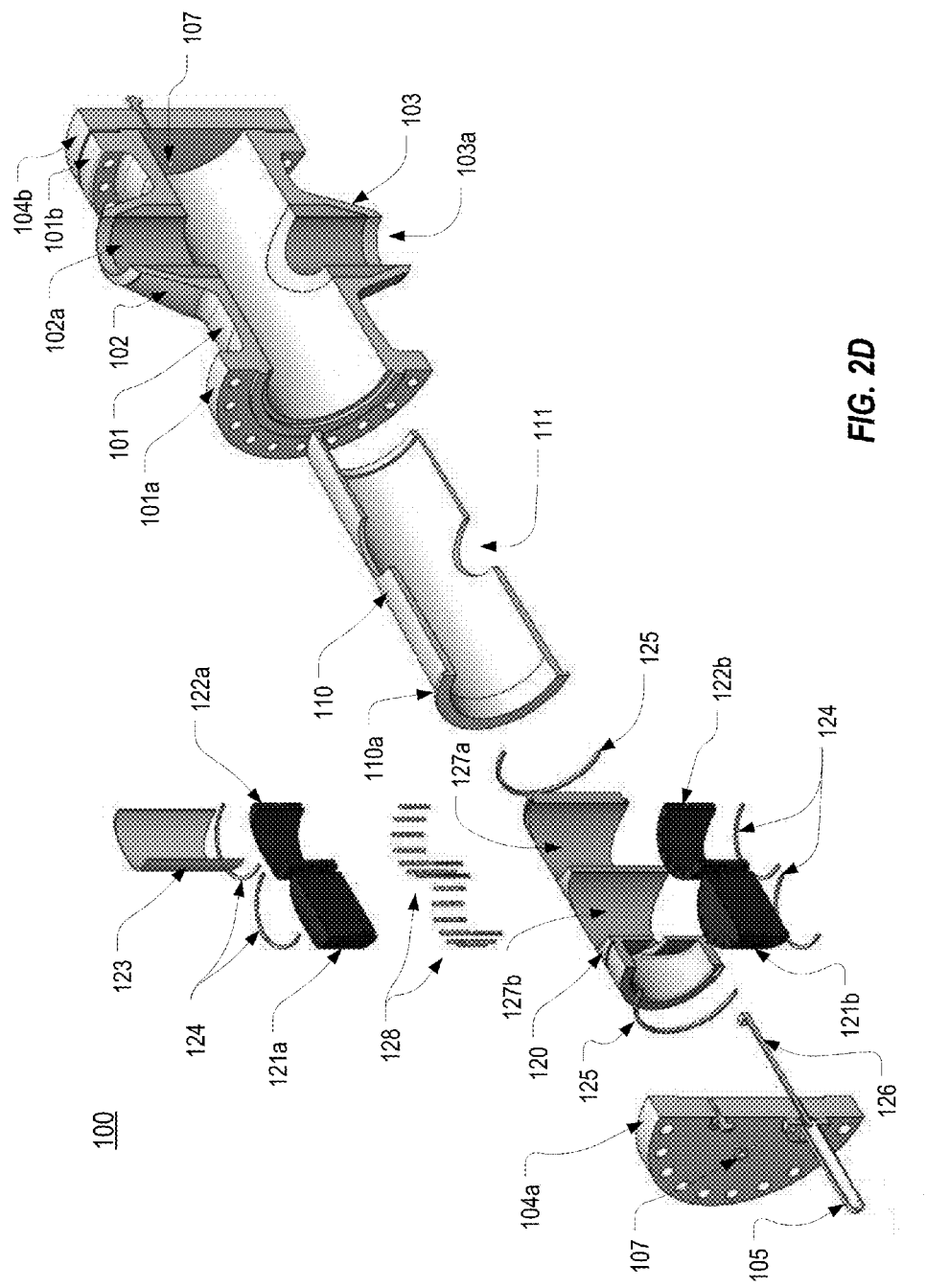
FIG. 2D illustrates an exploded cross-sectional perspective view of the cycle value of FIG. 2A.
Figure 2E:
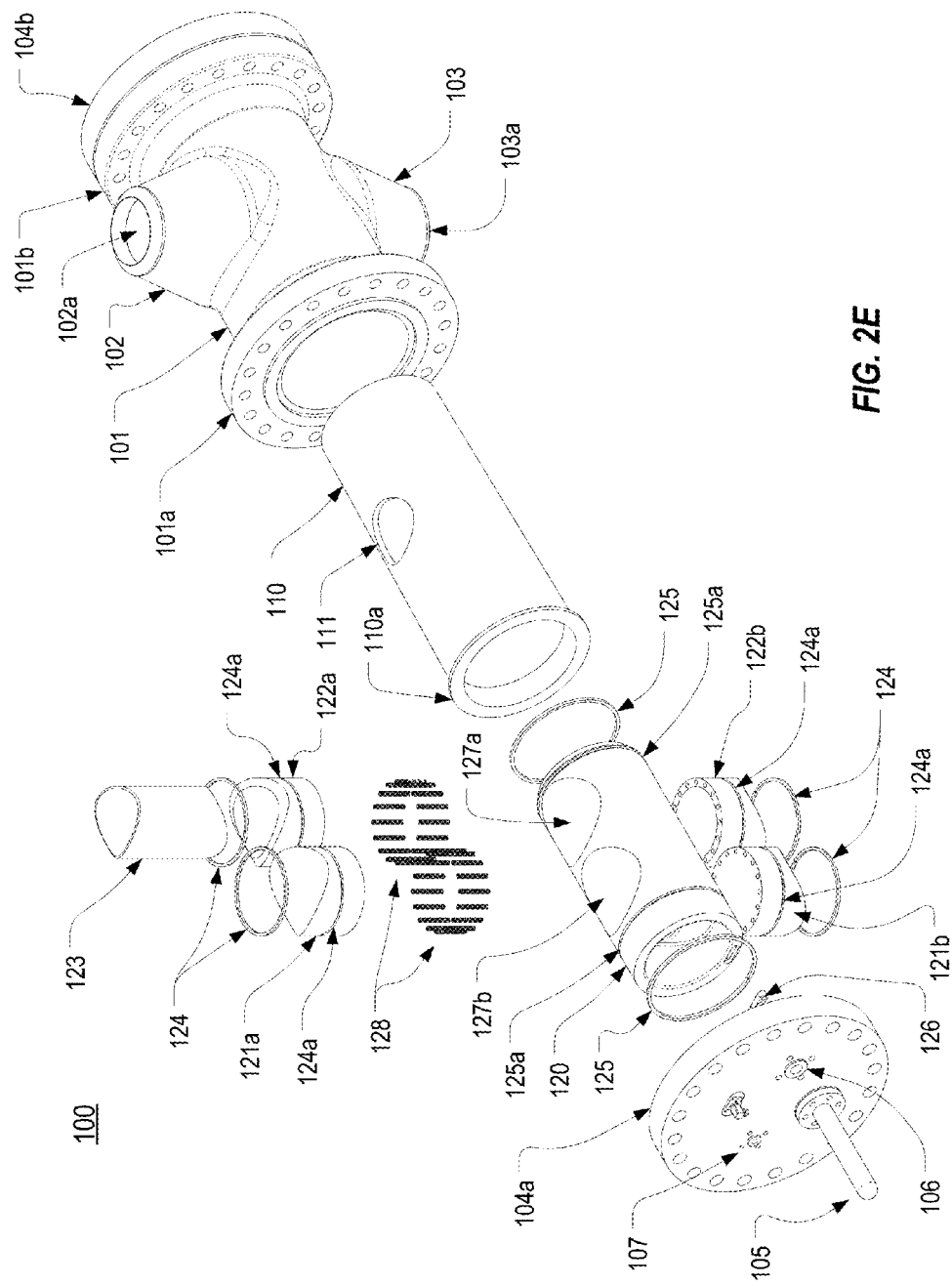
FIG. 2E illustrates an exploded perspective view of the cycle valve of FIG. 2A.
Figure 4:
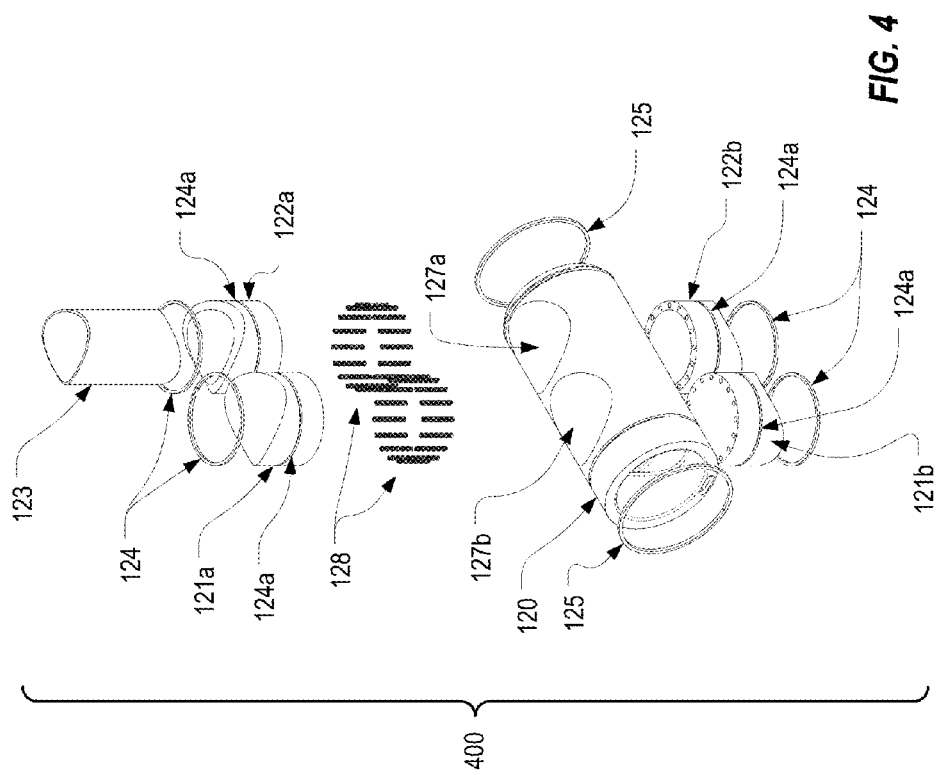
FIG. 4 illustrates an exploded view of the gate cartridge assembly.

The present invention is generally directed to a cycle valve for use in a hydromethanation system. FIGS. 2A-2E each illustrate different views of a cycle valve in accordance with one or more embodiments of the present invention. FIG. 2A illustrates a perspective view of a cycle valve 100 when assembled while FIGS. 2B and 2C provide cross-sectional views of valve 100 when in a closed and an open position respectively. FIGS. 2D and 2E illustrate an exploded cross-sectional view and an exploded view of cycle valve 100 respectively. Valve 100 generally comprises a valve body 101 which houses a dynamic sealing spool assembly 300.

Valve body 101 has a first flange 101a, a second flange 101b opposite first flange 101a, a first extension 102 that forms a first port 102a, and a second extension 103 that forms a second port 103a. First port 102a and second port 103a can be aligned to provide a direct pathway through valve body 101 when valve 100 is in an open position. First extension 102 and second extension 103 can each be configured to connect with a pipe or other structure of a hydromethanation system.

Valve 100 also includes a first cover 104a that is configured to be attached to first flange 101a (e.g., via bolts) and a second cover 104b that is configured to be attached to second flange 101b. Both first cover 104a and second cover 104b include an inflow check valve 106 through which a fluid can be injected into the interior of valve body 101 and an outflow check valve 107 through which fluid can escape from within the interior of valve body 101. These check valves are used to actuate the valve 100 between the open and closed positions as will be further described below. The fluids introduced into the valve are under pressure and may be any of the commonly used fluids used in the industry, for example, air, CO2, steam, and other compressed gases. In some embodiments, a rod may be attached to the piston gate to use an electric, hydraulic or pneumatic actuator to stroke the valve instead of a pressurized fluid. First cover 104a also includes a position indicator housing 105 into which a position indicator 126 can extend to indicate whether valve 100 is in an open or closed position. Although valve body 100 includes two flanges and corresponding covers, in some embodiments, valve body 100 may only include a single flange 101a and corresponding cover 104a while the opposite side of the valve body can be permanently sealed.

The interior of valve 100 comprises a dynamic sealing spool assembly 300. As best shown in FIGS. 3A and 3B, dynamic sealing spool assembly 300 is comprised of a sleeve 110 within which a gate cartridge assembly 400 slides. Sleeve 110 includes a sleeve opening 111 that is positioned to align with ports 102a, 103a when sleeve 110 is positioned within valve body 101. Sleeve 110 also includes a flange 110a that sits within flange 101a as best shown in FIGS. 2B and 2C. Sleeve 110 can have a length substantially equal to the length of the interior of valve body 101 so that sleeve 110 is immovably fixed within valve body 101 when cover 104a is secured to valve body 101.

Gate cartridge assembly 400 is comprised of a piston gate 120 that is configured to slide within sleeve 110. Piston gate 120 includes two openings 127a, 127b, each of which is configured to align with sleeve opening 111 and ports 102a, 103a when piston gate 120 is slid between an open position and a closed position respectively.

Because valve 100 is typically used in a pressurized and high-temperature environment, gate cartridge assembly 400 can include dynamic seat assemblies which form seals around sleeve opening 111 (and therefore around ports 102a, 103a due to the tight fit between sleeve 110 and the inner surface of valve body 101). As best shown in FIG. 2B, opening 127b of piston gate 120 has a greater diameter than sleeve opening 111. This greater diameter allows opening 127b to contain a dynamic seat assembly comprised of upper dynamic seat 121a and lower dynamic seat 121b. A number of springs 128 are positioned between upper dynamic seat 121a and lower dynamic seat 121b to bias seats 121a, 121b towards sleeve opening 111. Seats 121a, 121b are therefore forced against the inner surface of sleeve 110 surrounding sleeve opening 111 thereby forming a tight seal to prevent gas or particulates present within ports 102a, 103a from entering within the interior of valve body 101.

As best shown in FIG. 2C, opening 127a of piston gate 120 also has a greater diameter than sleeve opening 111 to thereby allow opening 127a to contain a dynamic seat assembly comprised of upper dynamic seat 122a and lower dynamic seat 122b. Upper and lower dynamic seats 122a, 122b differ from upper and lower dynamic seats 121a, 121b in that upper and lower dynamic seats 122a, 122b are cylindrical rather than solid. The cylindrical shape of upper and lower dynamic seats 122a, 122b form a flow chamber through valve body 101. A number of springs 128 are also positioned between upper and lower dynamic seats 122a, 122b to bias the seats against the inner surface of sleeve 110 surrounding sleeve opening 111 to thereby form a seal. The diameter of opening 127a and thickness of upper and lower dynamic seats 122a, 122b can be configured to allow a flow chamber lining 128 having an inner diameter matching the diameter of sleeve opening 111 to be positioned inside dynamic seats 122a, 122b. The inner diameter of flow chamber lining 128 can substantially match the diameter of sleeve opening 111. Flow chamber lining 128 can provide protection from gas and particulates as they pass through the flow chamber. For example, flow chamber lining 128 can prevent gas and particulates from passing between dynamic seats 122a, 122b (e.g., into the spring area). Flow chamber lining 128 can also protect the inner surfaces of dynamic seats 122a, 122b from corrosion or abrasion. Flow chamber lining 128 may also be easily replaced without requiring replacement of other parts of the valve.

Gate cartridge assembly 400 may also include a number of rings 124, 125 which provide additional seals within the assembly. As best shown in FIG. 2E, each of dynamic seats 121a, 121b, 122a, 122b includes a groove 124a within which a ring 124 can be placed. Rings 124 therefore form a seal between the outer surfaces of the seats and the inner surface of the corresponding opening 127a, 127b. This seal can prevent any gas and/or particulates that may pass between the biased seats from passing further into the interior of valve body 101. As is also best shown in FIG. 2E, the exterior surface of piston gate 120 can include grooves 125a on opposite ends. Rings 125 can be positioned within grooves 125a to form seals between the outer surface of piston gate 120 and the inner surface of sleeve 110 at each end of piston gate 120. This seal can prevent gas and/or particulates that may pass between the inner surface of sleeve 110 and seats 121a, 121b, 122a, 122b from passing further into the interior of valve body 101.

Gate cartridge assembly 400 also includes position indicator 126 which extends from an edge of piston gate 120. As best shown in FIGS. 2B and 2C, position indicator 126 extends into position indicator housing 105 when gate cartridge assembly 400 is slid into the open position. The presence of position indicator 126 within position indicator housing 105 serves to identify that valve 100 is in the closed position.

As mentioned above, each of first cover 104a and second cover 104b includes inflow check valve 106 through which air can be injected into the interior of valve body 101 and outflow check valve 107 through which air can be expelled from within the interior of valve body 101. Inflow check valves 106 can be used to cause gate cartridge assembly 400 to slide between the open and closed positions.

For example, FIG. 2B shows gate cartridge assembly 400 in the closed position (i.e., with piston gate 120 slid fully to the right). To open the valve, compressed air can be injected through inflow check valve 106 on second cover 104b. The increased air pressure inside second cover 104b will therefore cause gate cartridge assembly 400 to slide towards the open position shown in FIG. 2C. Outflow check valve 107 on first cover 104a can limit the rate of air flow out from the interior of valve body 101 opposite first cover 104a. By limiting the air flow, the speed at which gate cartridge assembly 400 slides towards the open position can be controlled to prevent harsh transitions between the closed and open positions. To transition back to the closed position, a similar process can be followed by injecting compressed air through inflow check valve 107 on first cover 104a to cause gate cartridge assembly 400 to slide towards the closed position. Outflow check valve 107 on cover 104b can limit the rate of air flow out of the interior of valve body 101 to control the rate at which gate cartridge assembly 400 transitions from the open to the closed position.

The design of dynamic sealing spool assembly 300 allows it to be easily removed from valve body 101 and replaced as necessary. For example, with first cover 104a removed, dynamic sealing spool assembly 300 can be withdrawn as a unit as shown in FIG. 3A. A replacement dynamic sealing spool assembly can then be slid back into valve body 101 if necessary. Also, once dynamic sealing spool assembly 300 has been withdrawn from valve body 101, gate cartridge assembly 400 can be withdrawn from within sleeve 110. This allows gate cartridge assembly 400 or any of its individual components to be quickly replaced independently of sleeve 110. Similarly, sleeve 110 can be replaced independently of gate cartridge assembly 400. This ability to quickly replace any or all of the internal components of valve 100 is beneficial in the hydromethanation process where any downtime significantly reduces productivity.

The materials used for the components of dynamic sealing spool assembly 300 can be selected to minimize friction between the components as the components slide between the open and closed positions. Also, materials can be selected that are suitable for use in pressurized, high temperature environments.

Figure 1:
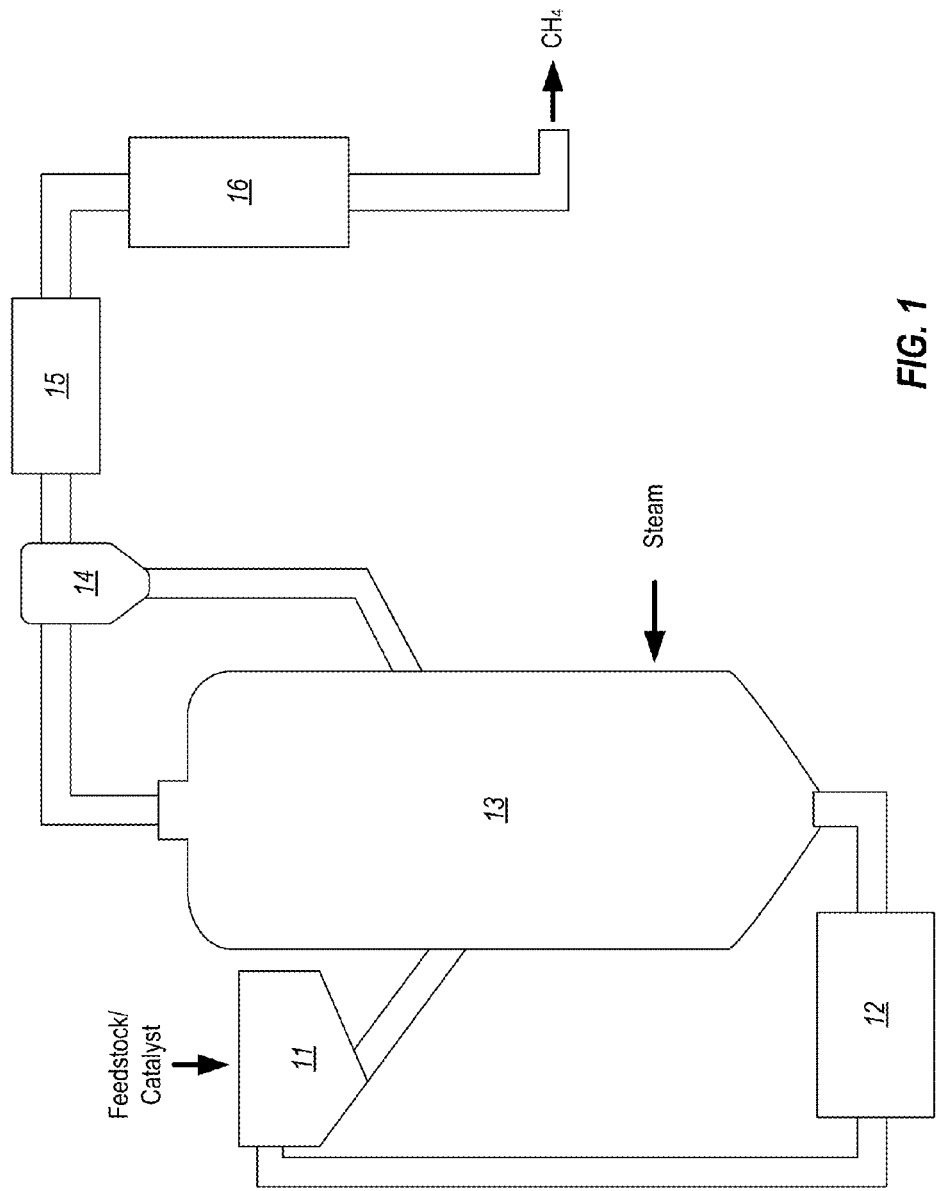
FIG. 1 illustrates a schematic of an example hydromethanation system in which a cycle valve in accordance with the present invention can be used.
Figure 5:
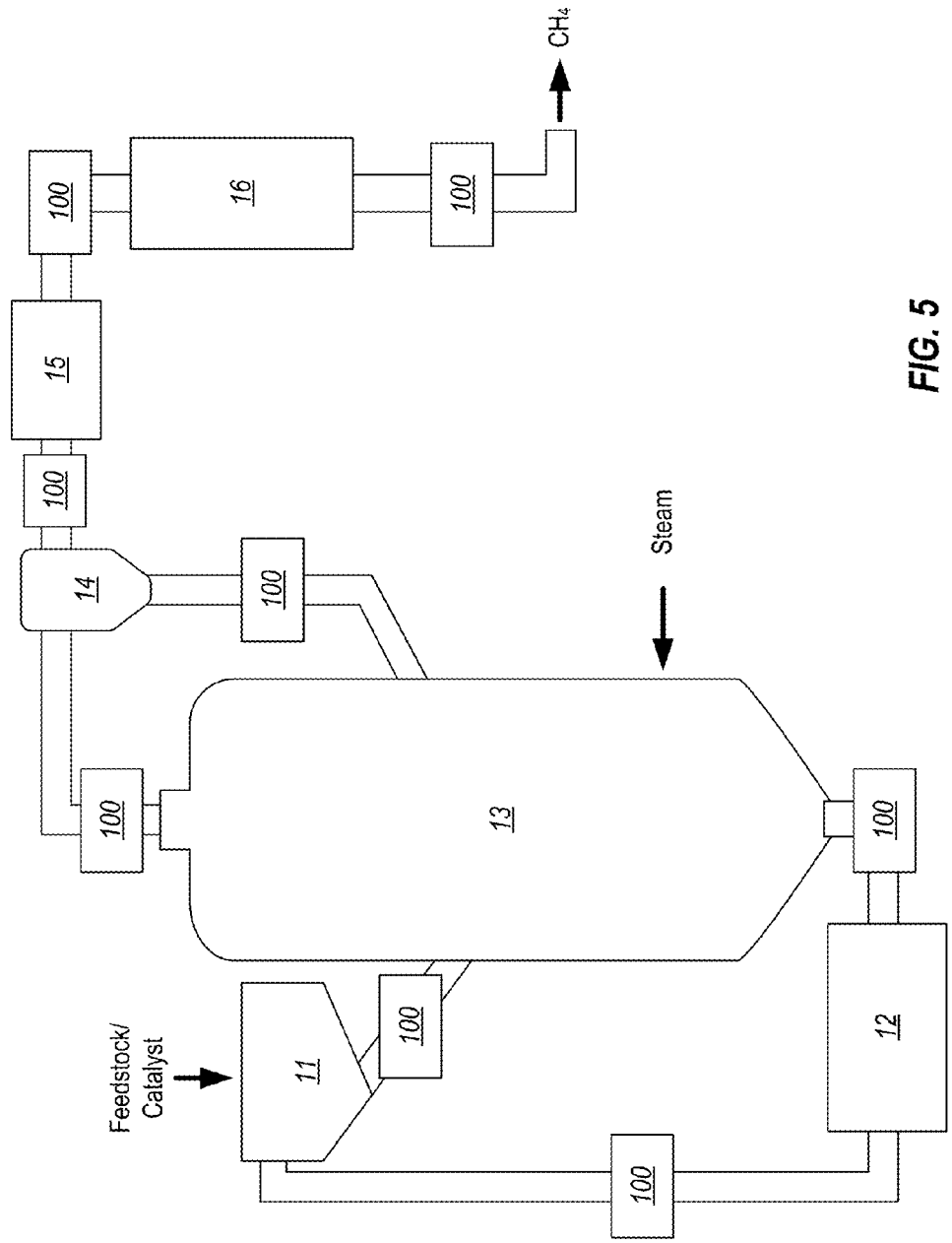
FIG. 5 illustrates the schematic of FIG. 1 with the addition of the cycle valve of the present invention in various locations.

FIG. 5 illustrates the schematic of FIG. 1 with the addition of valves 100 at various locations of the system. As shown, a cycle valve in accordance with embodiments of the present invention can be used in many different locations of a hydromethanation system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A valve comprising:
a valve body having a first flange, a first cover configured to attach to the first flange, a first port, and a second port, the first and second ports forming ports of a pathway through the valve body;
a sleeve inserted through the first flange into an interior of the valve body, the sleeve having a sleeve opening that aligns with the first and second ports;
a piston gate configured to insert into the sleeve, the piston gate having a first opening configured to align with the sleeve opening when the piston gate is in an open position and a second opening configured to align with the sleeve opening when the piston gate is in a closed position;
a first dynamic seat assembly contained within the first opening of the piston gate, the first dynamic seat assembly comprising a first upper dynamic seat, a first lower dynamic seat, and a plurality of springs positioned between the first upper dynamic seat and the first lower dynamic seat to bias the first upper dynamic seat and first lower dynamic seat against an inner surface of the sleeve surrounding the sleeve opening when the piston gate is in the open position, the first upper dynamic seat and the first lower dynamic seat each having a cylindrical shape that forms the pathway between the first and second ports when the piston gate is in the open position; and
a second dynamic seat assembly contained within the second opening of the piston gate, the second dynamic seat assembly comprising a second upper dynamic seat, a second lower dynamic seat, and a second plurality of springs positioned between the second upper dynamic seat and the second lower dynamic seat to bias the second upper dynamic seat and second lower dynamic seat against the inner surface of the sleeve surrounding the sleeve opening when the piston gate is in the closed position, the second upper dynamic seat and the second lower dynamic seat comprising solid blocks that cover the sleeve opening to block the pathway between the first and second ports when the piston gate is in the closed position.

2. The valve of claim 1, wherein the valve body includes a second flange opposite the first flange and a second cover configured to attach to the second flange.

3. The valve of claim 1, wherein the valve body includes a first inflow check valve and a second inflow check valve positioned on opposite sides of the valve body to allow fluid to be injected into the interior of the valve body on each side of the valve body to cause the piston gate to slide between the open and the closed positions.

4. The valve of claim 3, wherein the valve body includes a first outflow check valve and a second outflow check valve positioned on opposite sides of the valve body to allow air to be released at a controlled rate from within the interior of the valve body on each side of the valve body to control the speed at which the piston gate transitions between the open and closed positions.

5. The valve of claim 4, wherein one or both of the first inflow check valve and the first outflow check valve are contained within the first cover.

6. The valve of claim 1, wherein a rod is attached to the piston gate, said rod also being attached to an actuator to stroke the piston gate from outside of the valve.

7. The valve of claim 6, wherein the sleeve has a length that is substantially equal to the interior length of the valve body such that the sleeve remains immovably secured within the interior of the valve body when the first cover is attached to the first flange.

8. The valve of claim 1, wherein the piston gate includes one or more grooves within an exterior surface of the piston gate, each groove containing a ring that forms a seal between the piston gate and the sleeve.

9. The valve of claim 1, wherein the piston gate includes a position indicator that extends from an edge of the piston gate, the position indicator having a length sufficient to cause the position indicator to extend within a position indicator housing that extends from the first cover when the piston gate is transitioned between the open and closed positions.

10. The valve of claim 1, wherein each of the first and second upper dynamic seats and the first and second lower dynamic seats includes a groove in the exterior surface of the seat, the groove containing a ring that forms a seal between the exterior surface of the seat and the surface of the corresponding first or second opening of the piston gate.

11. The valve of claim 1, wherein the first dynamic seat assembly includes a flow chamber lining that is positioned within the first upper dynamic seat and the first lower dynamic seat.

12. The valve of claim 11, wherein the flow chamber lining has an inner diameter that is substantially equal to the diameter of the sleeve opening.

13. The valve of claim 1, wherein the sleeve opening is circular and each of the first and second upper dynamic seats and the first and second lower dynamic seats has a circular shape, and wherein a diameter of the sleeve opening is less than an outer diameter of each of the first and second upper dynamic seats and the first and second lower dynamic seats.

14. A valve comprising:
a valve body having a first flange, a first cover configured to attach to the first flange, a first port, and a second port, the first and second ports forming ports of a pathway through the valve body;
a sleeve in an interior of the valve body, the sleeve having a sleeve opening that aligns with the first and second ports;
a piston gate in the sleeve, the piston gate having a first opening configured to align with the sleeve opening when the piston gate is in an open position and a second opening configured to align with the sleeve opening when the piston gate is in a closed position;
a first dynamic seat assembly contained within the first opening of the piston gate, the first dynamic seat assembly comprising a first upper dynamic seat and a first lower dynamic seat, the first upper dynamic seat and first lower dynamic seat being biased against an inner surface of the sleeve surrounding the sleeve opening, the first upper dynamic seat and the first lower dynamic seat forming a seal to block the pathway between the first and second ports when the piston gate is in the closed position; and
a second dynamic seat assembly contained within the second opening of the piston gate, the second dynamic seat assembly comprising a second upper dynamic seat and a second lower dynamic seat, the second upper dynamic seat and second lower dynamic seat being biased against the inner surface of the sleeve surrounding the sleeve opening, the second upper dynamic seat and the second lower dynamic seat forming the pathway between the first and second ports when the piston gate is in the open position.

15. The valve of claim 14, wherein the valve body includes a first inflow check valve and a second inflow check valve positioned on opposite sides of the valve body to allow fluid to be injected into the interior of the valve body on each side of the valve body to cause the piston gate to slide between the open and the closed positions.

16. The valve of claim 15, wherein the valve body includes a first outflow check valve and a second outflow check valve positioned on opposite sides of the valve body to allow fluid to be released at a controlled rate from within the interior of the valve body on each side of the valve body to control the speed at which the piston gate transitions between the open and closed positions.

17. The valve of claim 14, wherein the piston gate includes one or more grooves within an exterior surface of the piston gate, each groove containing a ring that forms a seal between the piston gate and the sleeve.

18. The valve of claim 14, wherein the piston gate includes a position indicator that extends from an edge of the piston gate, the position indicator having a length sufficient to cause the position indicator to extend within a position indicator housing that extends from the first cover when the piston gate is transitioned between the open and closed positions.

19. The valve of claim 14, wherein a diameter of the sleeve opening is substantially the same as a diameter of the first and second ports.

20. The valve of claim 14, further comprising:
a first cover;
a dynamic sealing spool assembly; and
a gate cartridge assembly; the dynamic sealing spool assembly and the gate cartridge assembly being easily removable from the valve when the first cover is removed.

* * * * *